(12) United States Patent
Alemán Vázquez et al.

(10) Patent No.: US 10,077,334 B2
(45) Date of Patent: Sep. 18, 2018

(54) USE OF POLYMERS AS HETEROGENEOUS HYDROGEN DONORS IN THE UPGRADING OF HEAVY AND EXTRA-HEAVY CRUDES

(71) Applicant: INSTITUTO MEXICANO DEL PETRÓLEO, Mexico City (MX)

(72) Inventors: Laura Olivia Alemán Vázquez, México (MX); José Luis Cano Domínguez, México (MX); Federico Jiménez Cruz, México (MX); José Luis García Gutiérrez, México (MX); Fidencio Hernández Pérez, México (MX); María Teresa Mares Gallardo, México (MX)

(73) Assignee: INSTITUTO MEXICANO DEL PETRÓLEO, Mexico City (MX)

( * ) Notice: Subject to any disclaimer, the term of this patent is extended or adjusted under 35 U.S.C. 154(b) by 0 days.

(21) Appl. No.: 15/225,618

(22) Filed: Aug. 1, 2016

(65) Prior Publication Data
US 2017/0096525 A1   Apr. 6, 2017

(30) Foreign Application Priority Data

Aug. 6, 2015   (MX) .................. MX/A/2015/010173

(51) Int. Cl.
| | | |
|---|---|---|
| *C10G 45/00* | (2006.01) | |
| *C10G 45/16* | (2006.01) | |
| *C10G 45/18* | (2006.01) | |
| *C10G 45/20* | (2006.01) | |
| *C10G 45/28* | (2006.01) | |
| *C10G 47/00* | (2006.01) | |
| *C10G 47/26* | (2006.01) | |
| *C10G 47/28* | (2006.01) | |
| *C10G 47/30* | (2006.01) | |
| *C10G 47/34* | (2006.01) | |
| *C08G 63/66* | (2006.01) | |
| *C10G 11/00* | (2006.01) | |
| *C10G 9/00* | (2006.01) | |
| *C08G 63/78* | (2006.01) | |

(52) U.S. Cl.
CPC ............. *C08G 63/66* (2013.01); *C08G 63/78* (2013.01); *C10G 9/00* (2013.01); *C10G 11/00* (2013.01); *C10G 2300/80* (2013.01)

(58) Field of Classification Search
CPC ........ C10G 45/00; C10G 45/16; C10G 45/18; C10G 45/20; C10G 45/28; C10G 47/00; C10G 47/26; C10G 47/28; C10G 47/30; C10G 47/34
See application file for complete search history.

(56) References Cited

U.S. PATENT DOCUMENTS

| | | | |
|---|---|---|---|
| 3,413,212 A | | 11/1968 | Weisz |
| 4,294,686 A | | 10/1981 | Fisher et al. |
| 4,363,716 A | | 12/1982 | Greene et al. |
| 4,389,303 A | | 6/1983 | Simo et al. |
| 4,592,830 A | | 6/1986 | Howell et al. |
| 4,604,186 A | | 8/1986 | Lutz et al. |
| 4,615,719 A | | 10/1986 | Pauluk et al. |
| 4,640,765 A | * | 2/1987 | Kubo .................... C10G 47/34 208/110 |
| 4,857,168 A | | 8/1989 | Kubo et al. |
| 4,966,679 A | | 10/1990 | Kubo et al. |
| 5,891,829 A | | 4/1999 | Vallejos et al. |

(Continued)

FOREIGN PATENT DOCUMENTS

| | | |
|---|---|---|
| CA | 1122914 A | 5/1982 |
| CA | 1144501 A | 4/1983 |
| CA | 1152924 A | 8/1983 |

(Continued)

OTHER PUBLICATIONS

Asrar, J.; Toriumi, H.; Watanabe, J.; Krigbaum, W. R.; Ciferri, A J. Polym. Sci. Polym. Physics Ed., 21, pp. 1119-1131, 1983.

(Continued)

*Primary Examiner* — Randy Boyer (74) *Attorney, Agent, or Firm* — Anne M. Reynolds; Casimir Jones, S.C.

(57) ABSTRACT

The present invention is related to the application of solid polymers or copolymers prepared from monomers having in their structure a polycyclic aromatic ring, an aromatic ring of the type of naphthalene, or polyesters, polyethers, polyamides or polyvynil derivatives having naphthalene units in their structure, in the hydrotreatment or hydrocracking of heavy hydrocarbons, such as heavy or extra-heavy crude oils or residues from the distillation of petroleum; these polymers or copolymers may be supported, anchored or in a physical mixture with metallic oxides such as alumina, silica, titania or kaolin, and they have an application as heterogeneous hydrogen donors in reactions of hydrotreatment or hydrocracking of heavy or extra-heavy crude oils, residues from the distillation of petroleum and cuts and streams deived from this distillation. These solid polymers or copolymers operate in the presence of hydrogen or methane-rich gas. These hydrogen donor polymers, being solid, may be recovered from the reaction mixture to be reused and have a thermal stability that allows for their use in reactions at temperatures above 450° C. These heterogeneous hydrogen donors improve the physical properties of crude oils, such as API gravity, viscosity, and distillates yield, inhibiting the formation of coke.

11 Claims, 8 Drawing Sheets

(56) References Cited

U.S. PATENT DOCUMENTS

2012/0061291 A1 3/2012 Choi et al.
2016/0200644 A1* 7/2016 Aleman Vazquez ...... C07C 5/10
585/266

FOREIGN PATENT DOCUMENTS

| | | |
|---|---|---|
| EP | 0272038 A2 | 6/1988 |
| GB | 767592 A | 2/1957 |
| GB | 784136 A | 10/1957 |
| MX | 2014013477 A | 5/2016 |
| WO | 2005121020 A2 | 12/2005 |
| WO | 2009059369 A1 | 5/2009 |

OTHER PUBLICATIONS

Acierno, D.; La Manita, F. P.; Polizzotti, G.; Ciferri, A; Krigbaum, W. R.; Kotek, R. J. Polym. Sci. Polym. Physics Ed., 21, pp. 2027-2036, 1983.
Cai R.; Samulski, E. T. Macromolecules, 27, pp. 135-140, 1994.
Somogyi, A; Bojkova, N.; Padias, A B.; Hall, H. K. Jr. Macromolecules, 38, pp. 4067-4071, 2005.

* cited by examiner

USE OF POLYMERS AS HETEROGENEOUS HYDROGEN DONORS IN THE UPGRADING OF HEAVY AND EXTRA-HEAVY CRUDES

CROSS-REFERENCE TO RELATED APPLICATION(S)

This claims priority to Mexican Patent Application No. MX/a/2015/010173, filed on Aug. 6, 2015, the entire contents of which are fully incorporated herein by reference.

TECHNICAL FIELD OF THE INVENTION

The present invention relates to the application of heterogeneous hydrogen donors, also known as heterogeneous hydrogen transfer agents. These hydrogen transfer agents are constituted by solid polymers or copolymers prepared from monomers having in their structure a polycyclic aromatic ring, such as an aromatic naphthalene ring type or naphthalene unit, said polymers being for example polyesters, polyethers, polyamides or polyvinyl type derivatives, and the application claimed is the hydrotreatment or hydrocracking of heavy hydrocarbons such as heavy or extra-heavy crude oils or distillation residues of petroleum. These polymers may be supported, anchored or in physical mixtures with metal oxides such as alumina, silica, titania or kaolin. The application as heterogeneous hydrogen donors in reactions of hydrotreatment or hydrocracking of heavy and extra-heavy crude oils, distillation residues of crude oils and cuts and streams derived thereof, is carried out in the presence of hydrogen- or methane-rich gas. These hydrogen donor polymers, being solid, can be easily recovered from the reaction mixture for subsequent reuse and have a thermal stability that allows them to be used in these reactions at temperatures above 450° C. The application of these heterogeneous hydrogen donors leads to a greater improvement in physical properties of heavy crude oils such as API gravity, viscosity and distillates yield and inhibits coke formation.

BACKGROUND OF THE INVENTION

Currently, the upgrading of heavy crude oils is carried out mainly by thermal cracking or hydrocracking based on the carbon rejection or hydrogen addition routes. These processes have several problems such as coke deposition on the reactor walls and on the catalyst, the obtention of low-quality products or a low efficiency in the use of hydrogen. An efficient technology for producing high quality distillates from heavy crude oils or residues has not been developed. An alternative to improve the yield of high-value liquid products in the hydroprocessing of crude oils is the use of polymers as heterogeneous hydrogen donors, developed for hydrogenation reactions as described in Patent Application MX/E/2014/079971, in which polymers containing naphthenic-aromatic polycyclic units, such as naphthalene units, can be reversibly hydrogenated-dehydrogenated in the reaction mixture. The addition of hydrogen in heavy oil upgrading is limited by the availability of hydrogen, which must be transferred to the liquid phase before starting the hydrogenation reaction. In conventional hydroprocessing, the hydrogen availability is increased by increasing the partial pressure of hydrogen; the use of conventional hydrogen donors provides an additional quantity of hydrogen for the hydrogenation reaction. Hydrogen donor molecules are dehydrogenated by transferring hydrogen atoms to the heavy hydrocarbons, thus improving the quality of cracking products and inhibiting the polymerization of heavy molecules via a free radicals mechanism, resulting in a reduction in the coke formation and an increase in the yield of light and middle distillates.

|      | Decalin  | Tetralin | Naphthalene |
|------|----------|----------|-------------|
| M.p. | −43° C.  | −35° C.  | 80° C.      |
| B.p. | 193° C.  | 207° C.  | 218° C.     |

These compounds have physical properties such that, after mixing with a crude oil, require a separation process for their recovery and recycle, elevating the costs of the overall process. Several technologies that have been described using these hydrogen donors, in which they are identified as hydrogen donor diluents, are presented below.

Patent GB767592 describes a process and system for converting crude oil into lighter products by thermal cracking of the oils in the presence of a hydrogen donor diluent, such as partially hydrogenated aromatic streams, in which the purpose of the hydrogen donor is to transfer hydrogen to the heavier fractions in order to prevent coke formation during thermal cracking or coking operations.

Patent GB784136 claims a thermal cracking process to generate lighter products using hydrogen donor diluents, which are hydrogenated hydrocarbons from a stream with a 260-593° C. boiling point range with substantial proportions of condensed-rings aromatic hydrocarbons.

U.S. Pat. No. 3,413,212 describes a process for improving the properties of hydrocarbon cuts boiling above 204° C. to obtain hydrocarbon fractions in the gasoline boiling range using a hydrogen donor with a boiling point in the 290-593° C. range, with the aid of a crystalline aluminosilicate catalyst. The hydrogen donor is preferentially formed by partial hydrogenation of polynuclear aromatics, following a hydrogen transfer mechanism in the presence of a catalytic material, being decahydronaphthalene and 1,2,3,4-tetrahydronaphthalene some of the preferred hydrogen donors.

Canadian Patent CA1122914 describes a process for improving the properties of heavy hydrocarbon oils, such as specific gravity, viscosity and boiling range, using a hydrogen donor material under hydrocracking conditions. In this process an effluent with a 82-177° C. boiling range is re-hydrogenated and recycled into the hydrocracking zone at 300-570° C. An 11.1° API bitumen is converted into a 19.3° API crude oil.

Canadian Patent 1144501 describes a process for upgrading a heavy oil by admixing with a hydrogen donor diluent and subjecting the mixture to catalytic cracking in order to obtain higher value hydrocarbons. Thus, a fraction of gasoil generated in the above-mentioned process is subjected to hydrotreatment to be recombined with heavy oil in a new process.

Canadian Patent 1152924 describes a process for converting a high boiling point crude oil containing metals and at least 5% asphaltenes into an upgraded crude oil, using a hydrogen donor solvent at a pressure of 40-200 bar, temperature of 400-450° C. and 0.8-1.5 h$^{-1}$ LHSV.

U.S. Pat. No. 4,294,686 describes a process for upgrading a heavy crude oil by combining it with a hydrogen donor diluent obtained from the hydrogenation of a light cycle oil and subjecting this mixture to catalytic cracking at a pressure of 2.5-6 MPa, a temperature of 400-460° C. and LHSV of 0.8-7.0 and h$^{-1}$ in order to obtain higher value hydrocarbons. Subsequently, a gas oil fraction is subjected to hydrotreatment for combining it with heavy oil in a new process.

U.S. Pat. No. 4,363,716 claims a hydrogen donor solvent based on tetralin and naphthalene for upgrading heavy hydrocarbons to lighter products at 250-800° C. with residence times from 15 seconds to 5 hours, with subsequent removal of the atmospheric distillation fraction between 175-300° C. and hydrogenation of this fraction with a metallic catalyst to regenerate the hydrogen donor material.

U.S. Pat. No. 4,389,303 claims a process for converting a high boiling crude oil into light products using a hydrovisbreaking donor solvent constituted by mixtures of naphthenic base distillates in the 200-500° C. boiling range, solvent that is reacted with the crude oil at a pressure of 40-200 bar, 400-450° C. and LHSV 0.5-2 h$^{-1}$.

U.S. Pat. No. 3,413,212 describes a process for improving the properties of hydrocarbon cuts boiling above 204° C. to obtain hydrocarbon fractions in the gasoline boiling range using a hydrogen donor with a boiling point in the 290-593° C. range, with the aid of a crystalline aluminosilicate catalyst. The hydrogen donor is preferentially formed by partial hydrogenation of polynuclear aromatics, following a hydrogen transfer mechanism in the presence of a catalytic material, being decahydronaphthalene and 1,2,3,4-tetrahydronaphthalene some of the preferred hydrogen donors.

U.S. Pat. No. 4,389,303 mentions a crude oil hydrovisbreaking process at temperatures of 400-450° C. without a catalyst, in the presence of a hydrogen donor solvent derived from the same crude oil or a similar crude oil, and molecular hydrogen. The conversion of high boiling point crude oils (between 200 and 530° C.) having high contents of residue, metals and asphaltenes (5%) is achieved at pressures of 120-150 bar, LHSV of 0.8-1.5 kg/L·h and gas circulation between 400-2,000 m$^3$/MT. Naphthalene concentration remains constant in the circulation system and in the visbreaker promoting the conversion of the residue in the crude oil into distillable components by a molecular rearrangement of hydrogen.

U.S. Pat. No. 4,363,716 discloses a cracking process at 250-475° C. with short residence times (10 min-5 h) for upgrading heavy oil fractions favoring the selectivity towards distillates and reducing the coke formation, by means of a hydrogen donor solvent ($C_{10}$-$C_{14}$) obtained from the feedstock, that is recycled to the reaction zone after hydroprocessing; tetralin, alkyltetralins, dihydronaphthalene and dihydroalkylnaphthalenes are mentioned as specific hydrogen donors. The hydroprocessing step consists of a hydrogenation in the presence of a solid base-metal catalyst (Ni—Mo, Co—Mo, Ni—W) or a hydrogenation followed by a hydroisomerization in the presence of a solid acid catalyst (Si—Al, Si—Mg, Si—Al—Zr, acidic crystalline zeolites, phosphoric acid on kieselguhr) to obtain a fraction containing at least 30% by weight of hydrogenated 2-ring aromatic compounds in the 175 to 300° C. boiling range.

U.S. Pat. No. 4,592,830 refers to a hydro-visbreaking process for heavy oil fractions boiling above 538° C. using a hydrogen donor solvent (tetralin) obtained from the same heavy oil fraction. When the heavy oil fraction is heated in the presence of hydrogen and the solvent under hydrovisbreaking conditions (380-480° C.), a decrease in the heavy oil fractions in the feedstock is achieved. The process uses molybdenum dithiophosphate or dithiocarbamate in a concentration of molybdenum metal up to 1000 ppm based on total feed plus solvent. The reaction time is up to 10 hours, preferably 3 hours, under a pressure of 500 to 3000 psig. Using the hydrogen donor solvent, a greater solids reduction is achieved than without the solvent.

U.S. Pat. No. 4,604,186 describes the reduction of coke formation in heavy oil fractions (boiling range 370-510° C.) by combining hydrogen donors with the feedstock to a visbreaker and a fluid or delayed coker in series. The control of the quantity of hydrogen donor fed to both units allows for the control of the quantity of coke produced. The heavy fraction from the visbreaker effluent is the feedstock to the coker, and the light aromatic fraction from the coker, after hydrogenation, is recycled as hydrogen donor to the visbreaker. The operating temperatures of the coker and visbreaker are 370-510° C. and 427-525° C., respectively. The hydrogenated oil fraction is mixed with the residue in a proportion of 0.2 to 2 weight percent.

U.S. Pat. No. 4,615,719 discloses a process for visbreaking heavy residues from petroleum at an Equivalent Reaction Time of about 800 seconds at 427° C., without free hydrogen and in the presence of a highly aromatic hydrogen donor in a proportion of about 0.1 to 50 weight percent to obtain products with lower viscosities, the amount of donor being 20 weight percent relative to the heavy oil residue. The hydrogen donor may come from the FCC process or from a product of an origin different to petroleum. The visbreaking unit operates at a severity of 500 to 800 Equivalent Reaction Time seconds, temperature of 350-485° C. and a residence time of 1 to 60 minutes. The amount of hydrogen donor solvent is 0.1 to 20 weight percent of the heavy oil.

U.S. Pat. No. 4,640,765 discloses a method for cracking heavy crude oils containing at least 1 wt. % of asphaltenes without high pressure drops in the cracking towers due to coking. The authors describe a series of steps among which are: a) dividing the inside of the cracking tower vertically into at least two portions, communicated in the upper part; b) introducing the heavy oil, the hydrogen donor solvent and hydrogen; c) circulating the fluid keeping a temperature of 380-470° C., a pressure of 30-150 kg/cm$^2$ and a flow velocity of at least 1 cm/s in the cracking tower, with a residence time of 0.2 to 10 h. The hydrogen donor solvent is a hydride of an aromatic hydrocarbon containing at least 30% by weight of polycyclic aromatic hydrocarbons. A suitable catalyst is an oxide or sulfide of Group VII and VI metals on alumina, silica, Si—Al, Al—B, Si—Al—B, Si—Al—Mg Si—Al—Ti or a natural or synthetic zeolite, in a continuous flow process using a velocity of 5-100 cm/s and a preferred residence time of 30 minutes. The fluid is discharged from the top of the cracking tower and the solvent fraction is recycled.

Patent EU 0272038 describes a process for cracking a heavy oil fraction with an asphaltenes content >1 wt. % using a demetallizing and desulfurizing catalyst and a hydrogen donor solvent such as tetralin with an aromatics content greater than 30%. The circulation of a hydrogen-containing gas inhibits coke formation. The reaction product is hydrogenated in the presence of a solid catalyst, keeping a flow of hydrogen to avoid plugging. The oil and solvent flow at a velocity of 2 cm/s and LHSV is 1 h$^{-1}$ maximum. Temperature and pressure in the cracking reactor are kept at 380-470° C. and 30-150 kg/cm$^2$ and in the hydrogenation reactor at 330-440° C. and 30-150 kg/cm$^2$.

U.S. Pat. No. 4,857,168 describes a process for hydrocracking heavy oil fractions using a hydrogen donor as solvent, hydrogen gas and a hydrogenating catalyst in a reactor system at a temperature of 380-470° C. and a pressure of 30-150 kg/cm$^2$. The solvent inhibits the formation of carbonaceous materials and is discarded, but the concentration of tetralin is maintained at or above a fixed level. The process is applied to heavy oil fractions containing 10-30 wt. % of asphaltenes, with at least 50% of the feed boiling above 350° C. The catalyst has a demetallizing function, and both reactors (cracking and hydrogenation) are of the fixed-bed type.

U.S. Pat. No. 4,966,679 claims a method for hydrocracking of heavy oil fractions into lighter products using a catalyst, a hydrogen donor solvent (tetralin) and hydrogen gas in a cracking reactor. The hydrogenation of the reaction products in the presence of a solid catalyst and hydrogen gas converts the toluene insolubles into toluene-soluble compounds, thus avoiding plugging of the equipment. The catalysts are used in proportions of 50-70% by volume in the cracking reactor and 60-95% in the hydrogenating reactor. The linear velocity of the liquid is 3.5 cm/s in order to prevent high pressure drop. In one part of the reactor 20% by volume of the catalyst, the heavy oil and the solvent are circulated at a velocity of 2 cm/s. The hydrogen donor solvent is a hydride of polycyclic aromatic compounds (30% aromatics). A catalyst with a hydrodemetallizing function is used in the cracking reactor (380-470° C., 30-150 kg/cm$^2$) and a catalyst with a hydrodesulfurizing function is used in the hydrogenation reactor (330-440° C., 30-150 kg/cm$^2$).

U.S. Pat. No. 4,592,830 refers to a hydro-visbreaking process for heavy oil fractions boiling above 538° C. using a hydrogen donor solvent (tetralin) obtained from the same heavy oil fraction. When the heavy oil fraction is heated in the presence of hydrogen and the solvent under hydro-visbreaking conditions (380-480° C.), a decrease in the heavy oil fractions in the feedstock is achieved. The process uses molybdenum dithiophosphate or dithiocarbamate in a concentration of molybdenum metal up to 1000 ppm based on total feed plus solvent. The reaction time is up to 10 hours, preferably 3 hours, under a pressure of 500 to 3000 psig. Using the hydrogen donor solvent, a greater solids reduction is achieved than without the solvent.

U.S. Pat. No. 5,891,829 discloses a hydroconversion process applied to extra-heavy oil in the well for improving its properties (viscosity, API gravity and distillates yield). The process employs a hydrogen donor, methane and steam, which are injected into the oil well, wherein the minerals in the formation act as catalysts for the hydroconversion process. The concentration of hydrogen donor is 0.15-20 mol/kg of crude oil, methane ratio is about 0.4 mol/kg of crude oil and enough steam is used to raise the temperature in the oil well to 175° C. in order to start hydroconversion. The iron compounds are selected from $FeO$, $Fe_2O_3$, $Fe_3O_4$ $Fe_2(SO_4)_3$ and their mixtures.

Patent WO 2005/121020 refers to a method to produce hydrogen at a temperature below 900-1000° C. that involves heating hydrogen-containing materials that are capable of being processed in a hydrogenation unit, in the presence of a hydrogen donor, a catalyst that promotes catalytic hydrogen transfer and a base, at temperatures of 150-450° C., providing enough time to hydrogenate and dehydrogenate the hydrogen-containing material (1 to 4 h), in order to produce hydrogen and carbon and to collect the hydrogen generated. Neither carbon nor sulfur or nitrogen oxides are emitted to the atmosphere, remaining in the reacting mixture in the form of salts (sodium sulfide, ammonium hydroxide). The hydrogen donor may be a hydride, $C_8$-$C_{22}$ hydrocarbons, crude oils, fuels, plastics, tires or asphalt in an amount of 20 wt. %, based on the reactor contents. The hydrogen donor pre-moistens the feed. The catalyst is introduced into the reactor in a proportion of 1-20% and the operating temperature is 150-450° C. The catalyst may be a saturated or unsaturated hydrocarbon, an alcohol, a fatty acid, catalytic forms of carbon, nickel, iron, palladium and their mixtures. As for the base, it is an alkaline metal compound (oxide, hydroxide, carbonate, bicarbonate), at a 10% proportion to the feedstock. The reaction is carried out in a reducing environment at an operating temperature of 250-300° C.; the ammonium salt is introduced with the feedstock.

Patent WO 2009/059369 describes a liquefaction process to produce liquid hydrocarbons from carbonaceous solids, promoting the reaction of the feedstock, a catalyst and a hydrogen donor with supercritical carbon dioxide at a temperature of 350-500° C. and a pressure of 500-3000 psi, where the catalyst is dispersed in a diluent which is a polar or aprotic solvent (water, methanol, ethanol, acetonitrile, dimethyl sulfoxide, dimethylformamide or mixtures of these), using a catalyst/feed ratio of 1-20, particle size of the solid carbonaceous material 200-300 mesh, solvent/carbonaceous material ratio of 1:1 to 5:1 and reaction time of 60 to 480 min.

U.S. Patent 2012/00612991 refers to a hydrothermal process for upgrading hydrocarbons by means of the introduction into a reactor of the heavy feedstock, water, a preheated hydrogen donor composition and steam at a temperature of 400-450° C. and a pressure of 24-26 MPa, in the absence of a catalyst, with a residence time of 1-30 minutes, enough to bring about modifications to the feedstock. The hydrogen donor is heated and kept at a temperature above 50° C. for 10 minutes. Feedstock/water ratio is 1:10 to 10:1 and hydrogen donor/feedstock ratio is 0.005:1 to 0.1:1. The hydrogen donor composition comprises tetralin, alkyltetralins, liquefied carbon extract, petroleum distillates or cracking products.

As described in the patent documents above, the use of liquid hydrogen donors such as tetralin or decalin to inhibit coke formation in crude oil upgrading is well known; however, these compounds are expensive and their recovery and reuse is difficult, which is why in this invention we propose the use of heterogeneous hydrogen donors (polymers prepared from monomers that contain a polycyclic aromatic, aromatic-naphthenic or naphthenic ring, such as naphthalene units, in their structure) in the hydrotreatment or hydrocracking of heavy hydrocarbons, such as heavy or extra-heavy crude oils and residues from the distillation of petroleum.

Naphthalene-Base Polymers With High Melting and Decomposition Temperatures

In heavy and extra-heavy crude oils thermal hydrotreatment processes it is feasible to use solid hydrogen donors in fixed bed, ebullated bed or slurry continuous operation or batch reactors to carry out hydroprocessing reactions. The present innovation refers to the application of these polymers as heterogeneous hydrogen donors in the hydrotreatment or hydrocracking of heavy hydrocarbons, such as heavy or extra-heavy crude oils and residues from the distillation of petroleum.

Some properties of the hydrogen donor polymers object of the present invention are:

Melting and decomposition temperatures above 450° C.
Chemical stability of the polymer structure (functional groups).
Possibility of improving textural properties.
Possibility of forming (extruding).
Preparation from commercial raw materials.
Preparation can be scaled up to industrial production.

It is therefore an object of the present invention the application of polymers and co-polymers with naphthalene-, anthracene- or phenantrene-type units as heterogeneous hydrogen donors in the hydrotreatment or hydrocracking of heavy hydrocarbons, such as heavy or extra-heavy crude oils and residues from the distillation of petroleum; these heterogeneous hydrogen donors may be supported, anchored or in physical mixture with metallic oxides such as alumina, silica, titania or kaolin.

Another object of the present invention is the application of these heterogeneous hydrogen donor polymers, non-supported or supported on metallic oxides such as alumina, silica, titania or kaolin, as hydrogen donors in thermal hydrotreatment reactions of heavy or extra-heavy crude oils and cuts and streams derived from them, in the presence of hydrogen or methane-rich gas.

An additional object of the application of these heterogeneous hydrogen donor polymers is the improvement of some physicochemical properties of heavy or extra-heavy crude oils, such as viscosity, distillates yield and API gravity, while inhibiting the formation of coke in the hydrotreatment or hydrocracking of heavy hydrocarbons, such as heavy or extra-heavy crude oils and residues from the distillation of petroleum.

An additional object of the application of these heterogeneous hydrogen donors is in the hydrotreatment of petroleum fractions, such as naphthas, diesel, light and heavy gasoils, jet fuel, light cycle oil and bottom-of-the-barrel residues.

These and other objects of the present invention are set with more clarity and detail in the following chapters.

BRIEF DESCRIPTION OF THE DRAWINGS OF THE INVENTION

DETAILED DESCRIPTION OF THE INVENTION

This invention refers to an alternative for the upgrading of heavy and extra-heavy crude oils by reducing their viscosity, increasing their API gravity and yield of distillates, while inhibiting coke formation in the hydrotreatment or hydrocracking of heavy hydrocarbons, such as heavy or extra-heavy crude oils or residues from the distillation of petroleum, by means of the application of heterogeneous hydrogen donor polymers (usually naphthenic-aromatic polycyclic hydrocarbons or naphthalene-based compounds that may be reversibly hydrogenated-dehydrogenated in the reaction mixture). The hydroprocessing of heavy crude oils is limited by the availability of hydrogen, which must be transferred to the liquid phase before the hydrogenation reaction can start; usually the availability of hydrogen is increased by increasing the hydrogen partial pressure in the gas phase. Hydrogen donors provide an additional amount of hydrogen for the reaction, via dehydrogenation of the hydrogen donor molecules and transfer of hydrogen atoms to the heavy hydrocarbons, thus improving the quality of the cracking products and inhibiting the polymerization of the heavier hydrocarbons that proceeds through a free radicals mechanism. In this way coke formation is reduced and the yield of light and middle distillates can be increased.

tory textural properties via supporting or physical mixing on metallic oxides such as alumina, silica, titania or kaolin, preparation from commercial raw materials and possibility of scale-up for industrial production. Furthermore, in the present invention we describe the application of polymers and co-polymers of polycyclic hydrocarbons, such as polyaromatics, and more specifically polymers containing naphthalene, anthracene or phenantrene units, as heterogeneous hydrogen donors in the hydrotreatment or hydrocracking of heavy hydrocarbons, such as heavy or extra-heavy crude oils and residues from the distillation of petroleum, in the presence of hydrogen or a methane-rich gas.

The application of these heterogeneous hydrogen donor polymers enhances the improvement of some physicochemical properties of heavy and extra-heavy crude oils such as viscosity, coking tendency, yield of distillates and API gravity by hydrotreatment, thermal hydrocracking and reduction of unsaturated compounds in the presence of reducing agents such as hydrogen or methane.

The heavy and extra-heavy crude oil feedstocks that may be upgraded by means of the application of heterogeneous R,R'=—O-Aromatic-, —COO-Aromatic-, —CH$_2$CH$_2$—

Some properties of the heterogeneous hydrogen donor polymers applied to the upgrading of heavy and extra-heavy crude oils in this invention are:

Melting and decomposition temperatures above 450° C.
Chemical stability of the polymer structure (functional groups).
Possibility of improving textural properties.
Possibility of supporting on clay-type materials.
Preparation from commercial raw materials.
Preparation can be scaled up to industrial production.

It is important to point out that the technologies described in the state of the art present serious drawbacks, in that the recovery and recycle of conventional hydrogen donors is difficult and usually they remain in a mixture with the reaction products or they are separated by means of conventional separation technologies such as distillation, resulting in a loss of yield of products and an additional cost that reduces the value of these alternatives.

Figure 1:
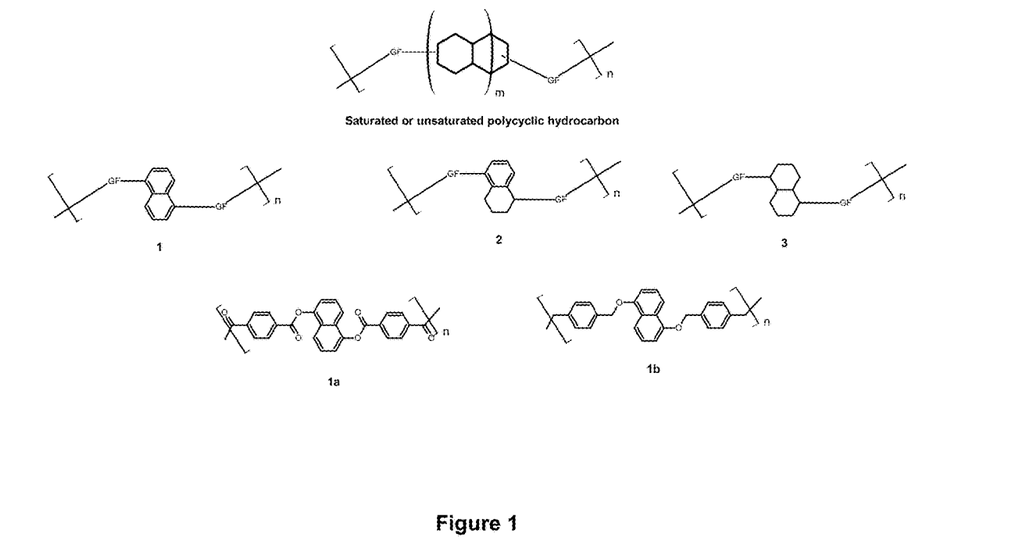
FIG. 1. Structures of hydrogen donor polymers with a system of polycyclic saturated and unsaturated hydrocarbons and as examples naphthalene 1, tetralin 2 or decalin 3 connected by different functional groups GF, such as esters 1a or ethers 1b.

Therefore, the present invention refers to the application of heterogeneous hydrogen donor polymers in the hydrotreatment or hydrocracking of heavy hydrocarbons, such as heavy or extra-heavy crude oils or residues from the distillation of petroleum, said polymers being based on polycyclic saturated or unsaturated hydrocarbons, having as a specific example polymers containing naphthalene, anthracene or phenantrene units and more specifically polyester-type polymers containing naphthalene such as the one described in FIG. 1, that present activity as hydrogen donors for unsaturated compounds reduction reactions and for the hydrocracking of high-molecular-weight molecules into lower molecular weight molecules in a fixed-bed, ebullated-bed or slurry reactor in batch or continuous operation that provides a suitable environment for the reduction and hydroprocessing reactions and in which the properties that are required from the hydrogen donor polymers are: melting and decomposition temperatures above 450° C., chemical stability of the polymer structure (functional groups), satisfachydrogen donor polymers are those in the 7 to 20° API range, and preferably in the 10 to 18° API range, and fractions derived from them having H/C ratios of 0.5 to 1.8, such as heavy gasoils, bottom-of-the-barrel residues and light cycle oils.

Figure 2:
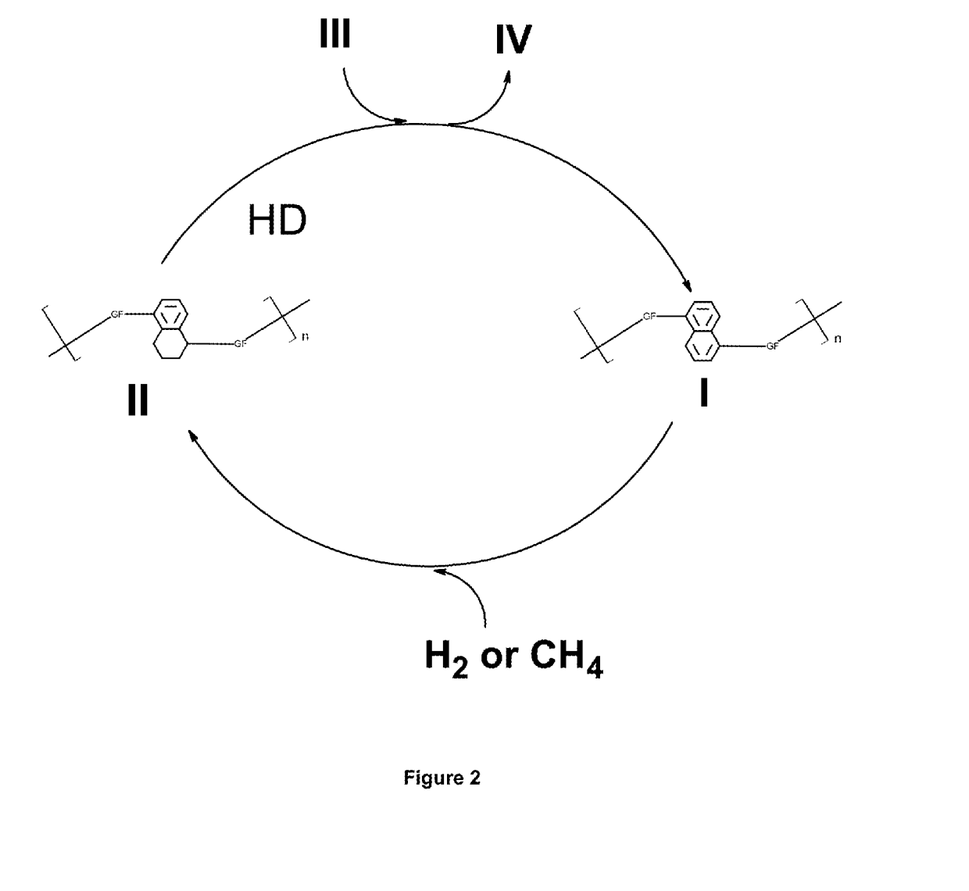
FIG. 2. Representation of the process cycle of the heterogeneous hydrogen donor polymer with a tetralin unit II that transfers hydrogen to the low-quality crude oil III obtaining a crude oil with improved properties IV and a polymer with a naphthalene unit I which by reaction with hydrogen regenerates the hydrogen donor polymer with a tetralin unit II and starts a new cycle.

FIG. 2 shows how hydrogen donor polymer I, in a reducing atmosphere such as hydrogen, methane, mixtures of these or a gas phase hydrocarbon mixture like natural gas, undergoes the conversion of the naphthalene unit to a tetralin unit II at suitable pressures and temperatures. The tetralin unit performs as a hydrogen donor and in the presence of unsaturated, high-molecular weight compounds typical of heavy and extra-heavy crude oils III transfers hydrogen atoms for reduction, hydrocracking and hydrogenation reactions, promoting the conversion of feedstock III to product IV, which is an upgraded, higher-hydrogen-content crude oil with improved properties such as viscosity, coking tendency, yield of distillates and API gravity.

To this end we present the following examples of heterogeneous hydrogen donor polymers that have melting and decomposition temperatures above 450° C., a chemically stable structure (functional groups), the possibility of improving their textural properties by mixing or supporting on clay-type materials or metallic oxides such as alumina, silica, titania or kaolin, are prepared from commercial raw materials and their synthesis process may be scaled-up. These polymers are polyesters derived from 1,5-dihydroxinaphthalene and from different carboxylic acids. These polymers have been described by Asrar, J.; Toriumi, H.; Watanabe, J.; Krigbaum, W. R.; Ciferri, A. J. Polym. Sci. Polym. Physics Ed., 21, 1119-1131, 1983; by Acierno, D.; La Manita, F. P.; Polizzotti, G.; Ciferri, A.; Krigbaum, W. R.; Kotek, R. J. Polym. Sci. Polym. Physics Ed., 21, 2027-2036, 1983; by Cai R.; Samulski, E. T. Macromolecules, 27, 135-140, 1994; and more recently by Somogyi, A.; Bojkova, N.; Padias, A. B.; Hall, H. K. Jr. Macromolecules, 38, 4067-4071, 2005. In these works different preparation procedures are described and some physical properties are presented. In particular, in our invention the polyester-type hydrogen donor polymers were prepared in two stages: the first stage is the acetylation of 1,5-dihydroxinaphthalene and the second stage is the polimerization of 1,5-diacetoxynaphthalene with different dicarboxylic acids. With the purpose of disclosing some examples of heterogeneous hydrogen donor polymers, we present the polymers prepared with terephthalic acid, diphenic acid, 4,4'diphenyldicarboxylic acid and 1,4-naphthalenedicarboxylic acid, which are identified in the examples as polyesters: Pester 1, Pester 2, Pester 3 and Pester 4, respectively.

Example 1

Preparation and Characterization of the Hydrogen Donor Polymer Identified as Pester 1.

158.8 g of 1,5 diacetoxynaphthalene, 108 g of terephthalic acid and 0.533 g of sodium acetate are mixed in a 1000 mL Parr reactor, the reactor is closed and agitation is started while introducing nitrogen with a flow of 100 cm$^3$/min. Once we have an inert atmosphere in the reactor the temperature is increased to 275-300° C. and the reactor is kept at this temperature for 2 hours. During this time the acetic acid generated inside the reactor is removed with a nitrogen flow and the molten reacting mixture starts to become solid. After this time the temperature is increased to 300-345° C. and kept at this temperature for 1-5 hours. Then, the temperature is increased to 350-395° C. and the pressure inside the reactor is reduced to 0.2-5 mm Hg, and these conditions are maintained for 2 to 5 hours. Finally, the reactor is allowed to cool to room temperature without agitation keeping a nitrogen atmosphere. The polymer obtained is washed with 200 mL of acetone, then with 200 mL of chloroform, with 200 mL of toluene and finally with 200 mL of acetone. The washed polymer is dried at 100° C. for 1 h in a vacuum oven. Yield: 149.3 g of the hydrogen donor polymer identified as Pester 1.

The hydrogen donor polymers identified as Pester 2, Pester 3 and Pester 4 are prepared in a similar manner. The following diagram shows these polyesters. Table 1 shows the values of melting points in ° C. determined by differential scanning calorimetry.

PESTER 1    PESTER 2    PESTER 4

PESTER 3

TABLE 1

Characteristics of polyester-type hydrogen donor polymers

| Polymer | M.p. ° C. |
|---------|-----------|
| Pester 1 | 443 |
| Pester 2 | 487 |
| Pester 3 | 480 |
| Pester 4 | 481 |

The polyester-type polymers with naphthalene units in their structure derived from 1,5-diacetoxynaphthalene and from different aromatic dicarboxylic acids that exemplify the heterogeneous hydrogen donor polymers used in the upgrading of heavy and extra-heavy crude oils object of the present invention can be supported in clay-type materials or metal oxides which can be alumina, silica, titania or kaolin, in order to obtain a material with a higher surface area that may be extruded in suitable forms to improve contact between the feedstock, the hydrogen donor and the reducing gas such as hydrogen or methane. Example 2 describes the preparation of a polyester supported on alumina or kaolin.

Example 2

Preparation and Characterization of the Polyester-Type Hydrogen Donor Polymer Identified as Pester 1 Supported on Alumina or Kaolin (a) Alumina Support.

70 g of boehmite and 44.2 mL of doubly-distilled water are thoroughly mixed. 20.2 mL of a 1 M formic acid solution are added and mixed to form a smooth paste. Then 21.6 g of the polymer identified as Pester 1 ground to a particle size less than 100 micrometers and water in the amount required for the preparation of a paste suitable for extrusion. The paste is introduced into a stainless steel extruder with a nozzle 2 mm in diameter and the extrusion is carried out. The extrudates are dried at 100° C. in a static air atmosphere throughout the night and then calcined in a nitrogen atmosphere at 500° C. for 2 hours. The yield is 70%.

(b) Kaolin-Silica Support.

33.9 g of kaolin and 20.7 mL of water are mixed. 14.5 g of Pester 1 polymer ground to a particle size less than 100 micrometers, 20.8 g of colloidal silica and 0.1 mL of formic acid are added and mixed to form a smooth paste. The extrudates are prepared, dried and calcined in the same way described above. The yield is 86%.

TABLE 2

Surface area of extruded polyester-type polymer identified as Pester 1

| Material | BET surface area m²/g |
|---|---|
| Polymer Pester 1 on alumina | 300.56 |
| Polymer Pester 1 on kaolin-silica | 135.23 |

The polyester-type polymer identified as Pester 1 is in a dynamic hydrogenation equilibrium in the reaction mixture as shown in FIG. 2. In the following paragraphs the process of reduction of the naphthalene unit in the polymer to a tetralin unit is described and the physical and chemical changes during the hydrogenation-dehydrogenation cycle are discussed. Example 3 shows the evaluation of the process of hydrogenation of polymers with naphthalene units. In particular the chemical and physical stability of the polymer identified as Pester 1 during the hydrogenation cycle is verified in the presence and absence of solvent.

Example 3

Thermal Hydrotreatment of the Polymer Identified as Pester 1 to Measure the Hydrogen Donating Capacity.

The evaluations were performed in a 300 mL Parr autoclave-type reactor. The reactor is of the Robinson-Mahoney type, checked to be leakage-free at a pressure of 100 atm, and the heterogeneous hydrogen donor polymer to be tested is placed in the internal basket.

In a first stage the polymer is purified under an atmosphere of nitrogen at 19 atm by heating to 430° C. for 2 hours. The yield of polymer after this purification step is 87 weight %.

The hydrogenation tests of the heterogeneous hydrogen donor polymer were carried out in the following way: 2.5 g of previously purified polymer are placed into the basket and the weight of the reactor and sample is recorded. The reactor is purged with a nitrogen gas stream at a pressure of 20 lb/in² for one minute. Afterwards, the reactor is purged and pressurized with hydrogen and the weight is recorded again. Finally the devices for heating, cooling and agitation (750 rpm) are placed into the reactor.

The test starts by heating the reactor to the required temperature and maintaining it during the hydrogenation time programmed. Once the reaction time is completed, the agitation is suspended, the heating resistance is quickly withdrawn and the reactor is cooled in a bath of water and ice. When the reactor reaches room temperature the cooling hoses are disconnected and the reactor is drained, dried and weighed. Then the reactor is opened, the gas is withdrawn and its weight is recorded to quantify the amount of gas formed in the test. Finally the reactor is opened to recover and quantify the hydrogenated polymer.

The experiments were conducted at 400-450° C., typically at 415-435° C., for 10-18 hours at different pressures, in order to evaluate the degree of reduction of the naphthalene and generation of the hydrogenated ring with hydrogen donor capacity. The values of pressure in the experiments were 5, 10, 20, 30, 40 and 80 atm.

Figure 3:
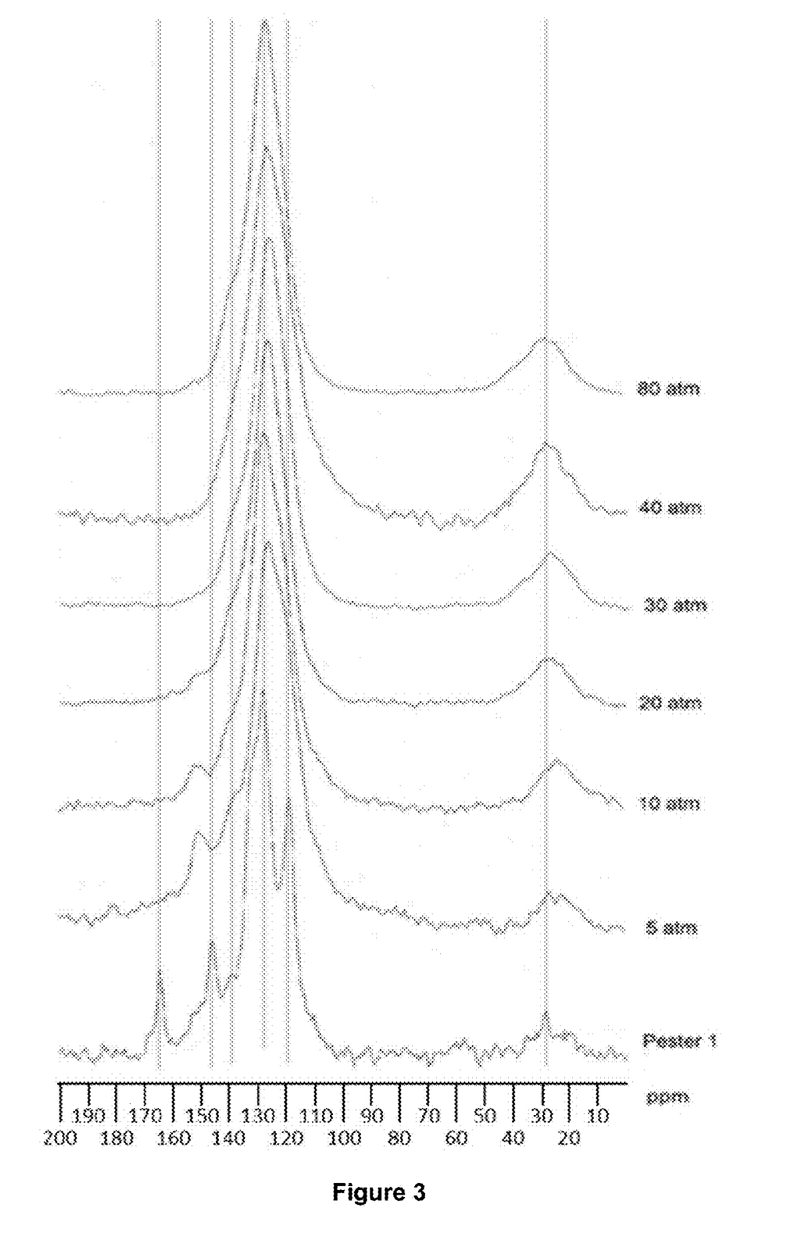
FIG. 3. $C^{13}$ solid NMR spectra of the hydrogen donor polymer 1a in which the structural changes brought about by the hydrogenation of the naphthalene unit and its conversion to a tetralin unit may be observed as a function of hydrogen pressure.

The heterogeneous hydrogen donor identified as Pester 1 subjected to the hydrogenation tests at different pressures, after washing and drying, was submitted to solid state $C^{13}$ NMR to monitor the structural changes in the molecule of the polyester-type polymer, and in particular to register the conversion of the naphthalene ring to hydrogenated rings with hydrogen donating capacity. In the NMR spectrum, the set of signals corresponding to the aromatic naphthalene ring unit is in the range of 150-100 ppm and the set of signals corresponding to the saturated unit is in the range of 40-15 ppm, as shown in FIG. 3.

In this Figure we can observe that as the pressure of the hydrogenation process increases, the naphthalene unit in the polymer is gradually hydrogenated to the corresponding structure with hydrogen donating capacity, and that in the polymer obtained in the range of 10 to 80 atm the naphthalene ring has been successfully hydrogenated and can perform as a hydrogen donor.

The physical aspect of the hydrogen donor polymer identified as Pester 1 before the process of hydrogenation is an amorphous solid, dark gray to black, dense and with high hardness, whereas the appearance of the polymer after hydrogenation is an amorphous solid, shiny black, light and brittle.

In the previous section the results that support the viability of the hydrogenation of the polymers with naphthalene units and in particular of the polymer identified as Pester 1 at a temperature of 415-450° C. were presented. In the following examples we show the evidences of the hydrogen donor capacity of these polymers and their ability to maintain this capacity for extended periods of time, in a cyclical process of reduction with hydrogen gas and donation of hydrogen for the hydrotreatment and cracking reactions of high-molecular-weight compounds as shown in FIG. 2, more specifically in the evaluation of these polymers as heterogeneous hydrogen donors in the upgrading of heavy and extra-heavy crude oils.

In the following examples the reference or blank test was the thermal hydrotreatment of a sample of heavy crude oil without using a heterogeneous hydrogen donor polymer.

Example 4

Thermal Hydrotreatment of Crude Oil Without Polymer

The crude oil used for hydrotreatment was a 12° API Mexican crude from the Ku Maloob Zaap fields, known as Ku crude oil, with the physicochemical properties shown in Table 3:

TABLE 3

Properties of the 12° API crude oil from Ku Maloob Zaap

| | |
|---|---|
| Specific gravity 20/4° C. | 0.986 |
| Total sulphur, wt % | 5.17 |
| Total nitrogen, ppm | 4824 |
| Basic nitrogen, ppm | 1155 |
| Nickel, ppm | 85 |
| Vanadium, ppm | 444 |
| Salt content, ptb | 2 |
| nC7 insolubles, wt % | 19 |
| Kinematic viscosity at 60° C., cst | 1639 |
| Water by distillation, vol % | 0.05 |

Example 5

Thermal Hydrotreatment of the 12° API Ku Crude Oil in a Pilot Plant, in a Continuous Flow Reactor (FIG. 4) Packed With the Heterogeneous Hydrogen Donor Polymer Pester 1.

Figure 4:
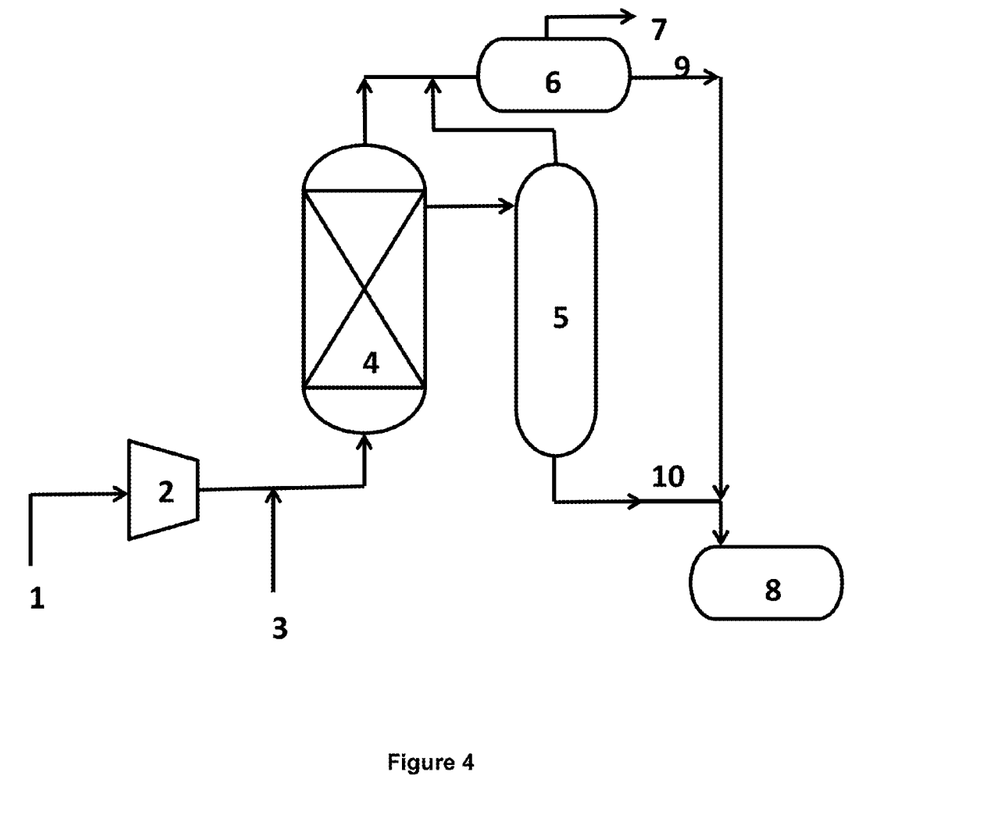
FIG. 4. Scheme of the process flow diagram for the treatment of heavy crude oil with the heterogeneous hydrogen donor polymer in a continuous flow reactor. Number 1 marks the crude oil feed which is heated in section 2 and number 3 identifies the hydrogen or methane feed to the reactor 4 from where the light fractions and gases are sent to section 6 and the upgraded heavy fractions to section 5. In section 6 the gases 7 are separated from the light fractions 9 which are mixed with the upgraded heavy fractions 10 to generate the upgraded crude oil 8.
Figure 5:
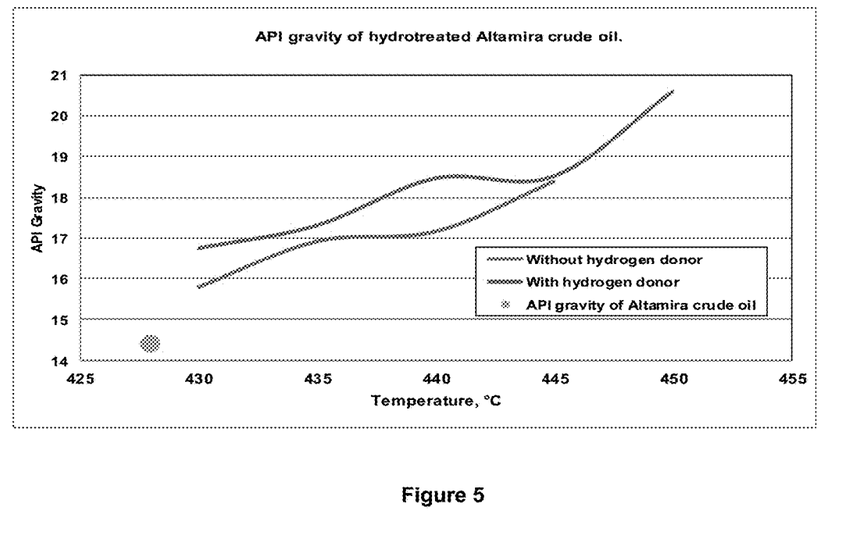
FIG. 5. Results of API gravity of upgraded crude oils obtained in a pilot plant with and without a packed bed of heterogeneous hydrogen donor polymer in the reactor, using a 14.66° API crude oil known as Altamira and hydrogen as reducing agent.
Figure 6:
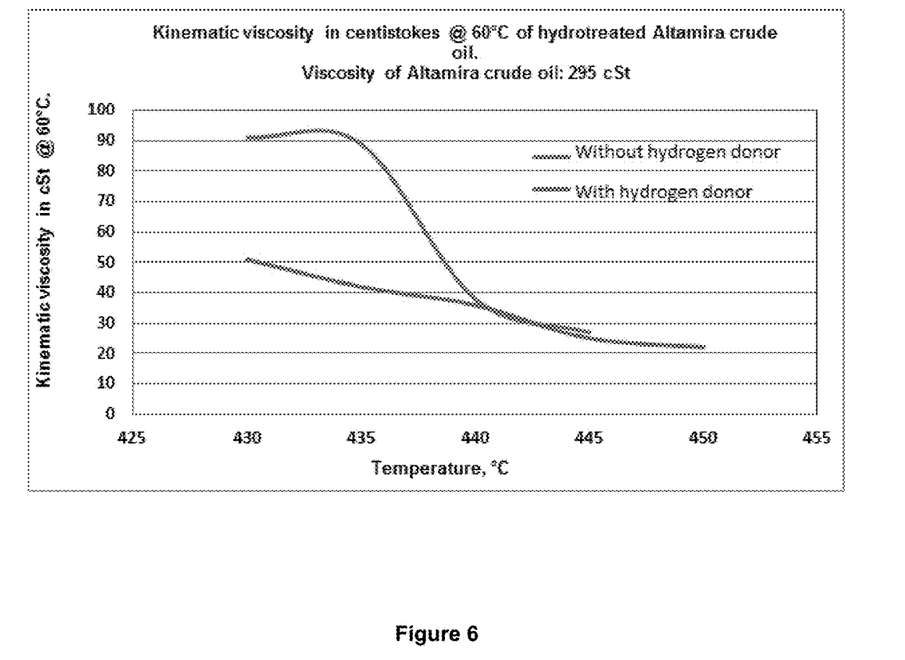
FIG. 6. Results of kinematic viscosity cSt of upgraded crude oils obtained in a pilot plant with and without a packed bed of heterogeneous hydrogen donor polymer in the reactor, using a 14.66° API crude oil known as Altamira and hydrogen as reducing agent.
Figure 7:
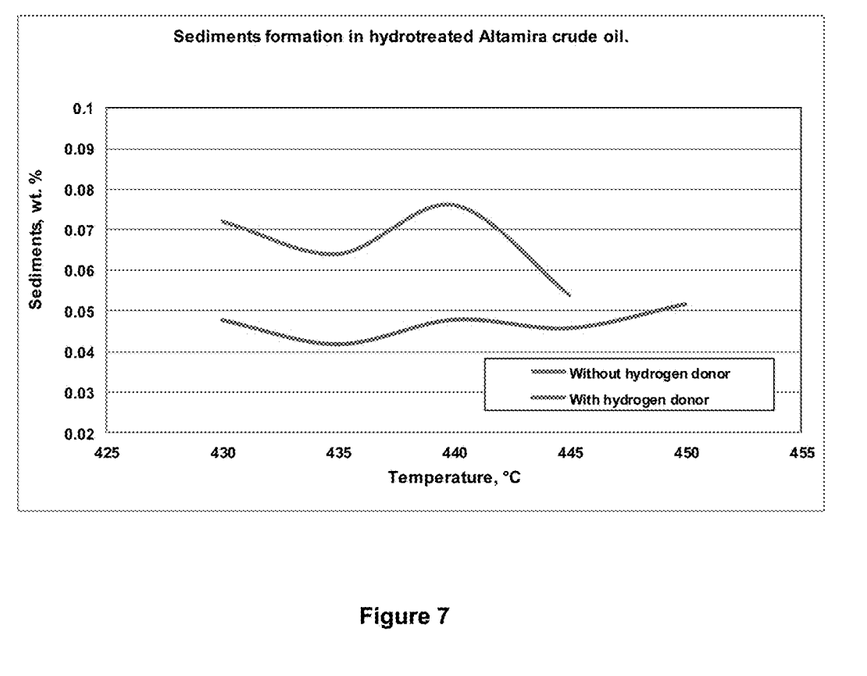
FIG. 7. Results of sediments formation determined by the ASTM-D-4807 method of upgraded crude oils obtained in a pilot plant with and without a packed bed of heterogeneous hydrogen donor polymer in the reactor, using a 14.66° API crude oil known as Altamira and hydrogen as reducing agent.
Figure 8:
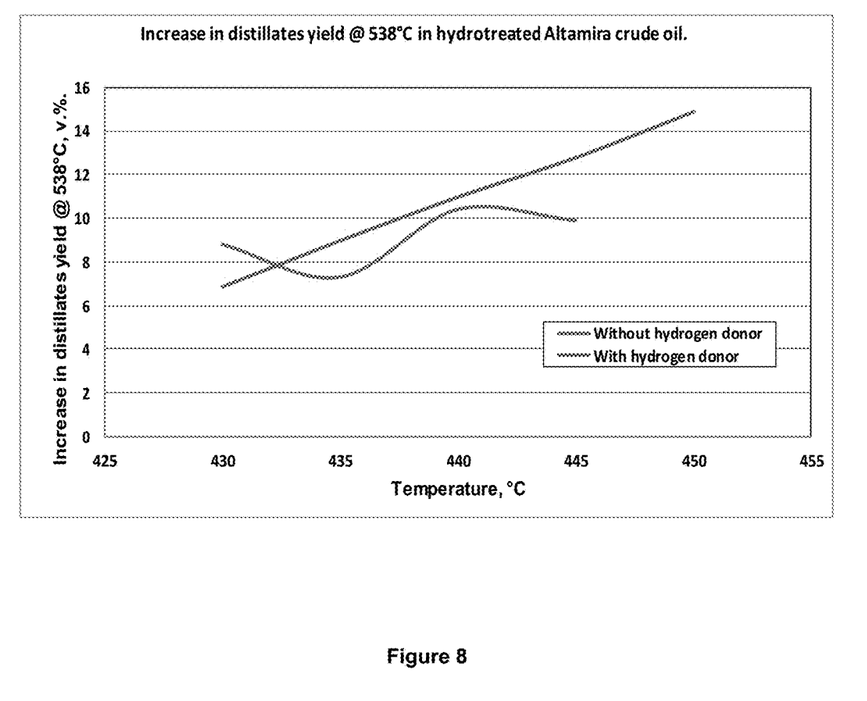
FIG. 8. Results of increase in the distillates yield with respect to the feedstock determined by gas chromatography with SimDis software of upgraded crude oils obtained in a pilot plant with and without a packed bed of heterogeneous hydrogen donor polymer in the reactor, using a 14.66° API crude oil known as Altamira and hydrogen as reducing agent.

In the reaction system shown in FIG. 4 and described in the figure captions, the reactor was loaded with 500 mL of the heterogeneous hydrogen donor polymer Pester 1, having a density of 0.82 g/mL; the hermeticity of the system was tested with nitrogen and the flow was adjusted to 80-250 SLPH, maintaining a pressure of 0.5 to 4 kg/cm² inside the reactor. The reactor was heated with nitrogen at a rate of 3-35° C./min until reaching 120° C. and the temperature was maintained at 120° C. for 2-4 hours. The temperature in the reactor was raised to 400-490° C. and maintained at 450° C. for 2-6 hours, the flow of nitrogen was replaced with industrial-grade hydrogen and the operating pressure was adjusted to 30-75 kg/cm². 200 SLPH of hydrogen were fed to the reactor by the crude oil-hydrogen feed line and 100 SLPH were fed by the gas heater line. The feed vessel and crude oil pump suction and discharge lines were heated. The temperature in the reactor wall was stabilized at 400° C., with the feed flow adjusted at 1000 mL/h. The bottoms product was recovered from the separator and the light product from the condensate tank. During the test the gas product was analyzed by chromatography every 8 hours, determining $H_2S$, $H_2$ and $C_1$ to $C_6$ paraffins and olefins. At the end of the last balance, the reactor temperature was lowered to 200° C. at a rate of 40° C./min, maintaining the flow of crude oil. After reaching 200° C. in the reactor the flow of crude oil was stopped.

Example 6

Thermal Hydrotreatment of the 12° API Ku Crude Oil With the Heterogeneous Hydrogen Donor Polymer Pester 1 Extruded with Silica-Kaolin The pilot plant continuous flow reactor (FIG. 4) was loaded with 500 mL of the heterogeneous hydrogen donor polymer Pester 1 extruded with silica-kaolin, having a density of 0.82 g/mL; the hermeticity of the system was tested with nitrogen and the flow was adjusted to 80-250 SLPH, maintaining a pressure of 0.5 to 4 kg/cm² inside the reactor. The reactor was heated with nitrogen at a rate of 3-35° C./min until reaching 120° C. and the temperature was maintained at 120° C. for 2-4 hours. The temperature in the reactor was raised to 400-490° C. and maintained at 450° C. for 2-6 hours, the flow of nitrogen was replaced with industrial-grade hydrogen and the operating pressure was adjusted to 30-75 kg/cm². 200 SLPH of hydrogen were fed to the reactor by the crude oil-hydrogen feed line and 100 SLPH were fed by the gas heater line. The feed vessel and crude oil pump suction and discharge lines were heated. The temperature in the reactor wall was stabilized at 400° C., with the feed flow adjusted at 1000 mL/h. The bottoms product was recovered from the separator and the light product from the condensate tank. During the test the gas product was analyzed by chromatography every 8 hours, determining $H_2S$, $H_2$ and $C_1$ to $C_6$ paraffins and olefins.

Example 7

In the Following Examples, We Highlight the Hydrogen Donor Capabilities of the Heterogeneous Hydrogen Donor Polymer Pester 1 Extruded With Kaolin-Silica in the Upgrading of a 14.66° API Heavy Crude Oil Known as Altamira.

The evaluation was carried out in the reaction system shown in FIG. 4, using the conditions and the procedures described in Example 6.

TABLE 4

Properties of Altamira crude (14.6° API)

| | METHOD | |
|---|---|---|
| GENERAL PROPERTIES | | |
| API GRAVITY | ASTM-D-287 | 14.66 |
| SPECIFIC GRAVITY 20/4° C. | ASTM-D-1298 | 0.9552 |
| TOTAL SULPHUR, WT % | ASTM-D-4294 | 5.422 |

TABLE 4-continued

Properties of Altamira crude (14.6° API)

| | METHOD | |
|---|---|---|
| SPECIFIC PROPERTIES | | |
| WATER AND SEDIMENTS, VOL % | ASTM-D-4007 | 0.05 |
| WATER BY DISTILLATION, VOL % | ASTM-D-4006 | |
| SEDIMENTS BY EXTRACTION, WT % | ASTM-D-473 | 0.03 |
| nC5 INSOLUBLES, WT % | ASTM-D-4055 | 17.08 |
| nC7 INSOLUBLES, WT % | ASTM-D-3279 | 10.68 |
| RAMSBOTTOM CARBON, WT % | ASTM-D-524 | 13.05 |
| CONRADSON CARBON, WT % | ASTM-D-189 | 13.48 |
| POUR POINT, ° C. | ASTM-D-97 | −21 |
| TOTAL NITROGEN, PPM | ASTM-D-4629 | 2756 |
| BASIC NITROGEN, PPM | UOP-313 | 438 |
| SIMULATED DISTILLATION, ° C. | ASTM-D-7169 | |
| IBP | | 31.8 |
| 10 VOL % | | 184.6 |
| 20 VOL % | | 293.8 |
| 30 VOL % | | 372.4 |
| 40 VOL % | | 442 |
| 50 VOL % | | 519.4 |
| FBP | | 537.6 |
| VISCOSITY, mm2/s @ | ASTM-D-445 | |
| 15.6° C. | | 4146.81 |
| 25° C. | | 1947.07 |
| 37.8° C. | | 777.57 |
| 54.4° C. | | 228.13 |
| 60° C. | | 188.07 |
| METALS, PPM | ASTM-D-5863 | |
| NICKEL | | 67.48 |
| VANADIUM | | 238.14 |

An analysis of the results shown in FIGS. 5, 6, 7 and 8, obtained in a test carried out at different temperatures in a pilot plant using Altamira crude oil as feedstock, the heterogeneous hydrogen donor polymer Pester 1 and hydrogen as a reducing agent, shows clearly the effect of heterogeneous hydrogen donors in the upgrading of heavy crude oils. At 445° C. an increase of 4 units in the API gravity, a lowering of the viscosity at 60° C. from 188 to 25 cSt and an increase in the yield of distillates of 13 vol. % were achieved, with a low (0.045 wt %) sediments content.

The invention claimed is:

1. A method for hydrotreatment or hydrocracking of heavy hydrocarbon feedstocks, comprising:

hydrogenating a heavy hydrocarbon in the presence of at least one hydrogen donor;

wherein the hydrogen donor comprises at least one solid polymer or at least one solid copolymer containing units with two or more fused aromatic, alicyclic, or heterocyclic rings, or any combination thereof.

2. The method of claim 1, wherein the polymer or copolymer has a melting and decomposition temperature above 450° C.

3. The method of claim 1, wherein the polymer or copolymer is chemically stable in reducing atmospheres at temperatures up to 450° C.

4. The method of claim 1, wherein the hydrotreatment or hydrocracking of heavy hydrocarbons is carried out in the presence of a gas rich in hydrogen or methane.

5. The method of claim 1, wherein the hydrotreatment or hydrocracking of heavy hydrocarbons is carried out in a fixed bed, ebullating bed, or slurry reactor, in a continuous or batch operation.

6. The method of claim 1, wherein the polymer or copolymer contains polyaromatic structures, polyester structures, polyether structures, polyamide structures or polyvinyl derivative structures.

7. The method of claim 1, wherein the polymer or copolymer is supported, anchored, or in a physical mixture with solid materials.

8. The method of claim 1, wherein the polymer or copolymer is supported, anchored, or in a physical mixture with metallic oxides.

9. The method of claim 8, wherein the metallic oxides are selected from alumina, silica, titania, and kaolin.

10. The method of claim 1, wherein the polymer or copolymer is used alone or in combination with a catalyst.

11. A method for hydrotreatment or hydrocracking of heavy hydrocarbon feedstocks, comprising:
   hydrogenating a heavy hydrocarbon in the presence of at least one hydrogen donor;
   wherein the hydrogen donor comprises at least one solid polymer or at least one solid copolymer containing units with two or more fused aromatic, alicyclic, or heterocyclic rings, or any combination thereof; and
   wherein the polymer or copolymer has a melting and decomposition temperature above 450° C.

* * * * *